UNITED STATES PATENT OFFICE.

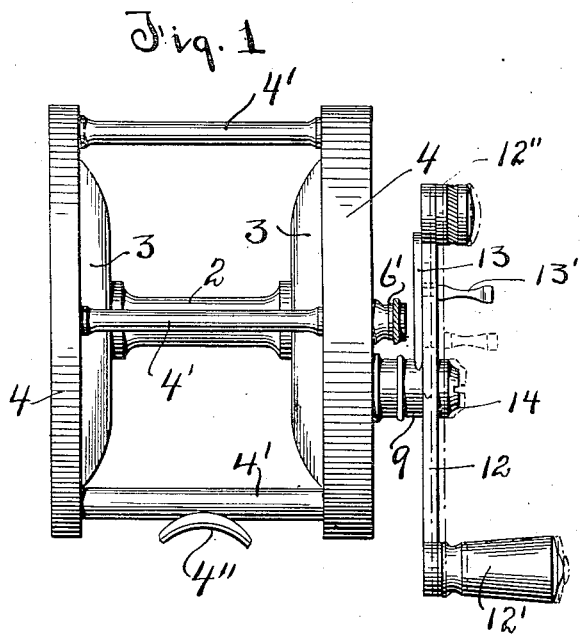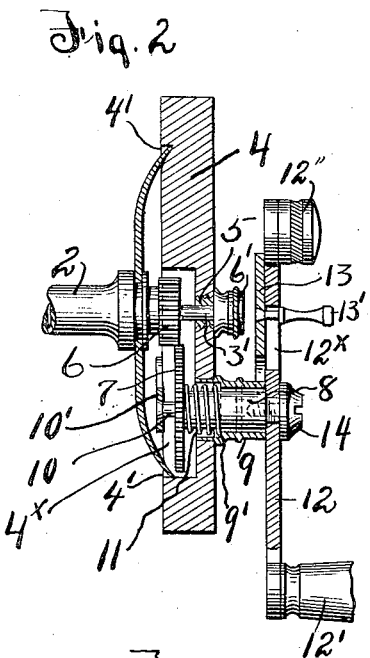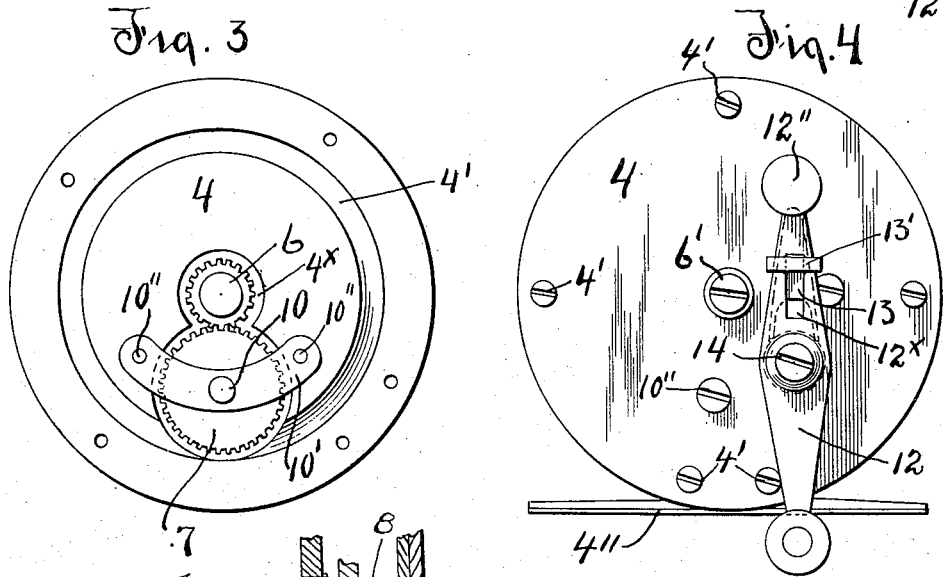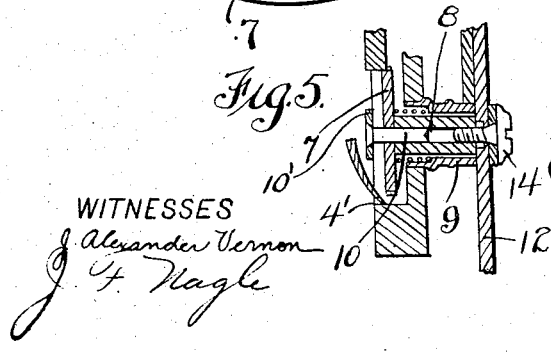

CHARLES ULRICH, OF NEW YORK, N. Y.

FISHING-REEL.

No. 870,327.

Specification of Letters Patent.

Patented Nov. 5, 1907.

Application filed March 30, 1907. Serial No. 365,475.

*To all whom it may concern:*

Be it known that I, CHARLES ULRICH, a citizen of the United States, residing at New York, county of New York, and State of New York, have invented certain new and useful Improvements in Fishing-Reels, of which the following is a specification.

My invention relates to fishing reels where a crank is used either for directly or indirectly rotating the reel, and particularly to means for disconnecting the crank and its attached mechanism from the reel shaft and its gears so as to allow the reel to rotate free from the crank.

The object of my invention is to provide a particularly simple mechanism to this end; one peculiarly adapted to multiplying reels, placed upon the reel crank and therefore very conveniently located for quick action.

The invention consists in the arrangement of parts and details of construction described in the specification, and more particularly stated in the claims.

In the drawings, Figure 1 is a rear elevation of a reel provided with my improvement. Fig. 2 is a section of one of the side plates to show the exact construction of the crank arbor and its connected parts. Fig. 3 is an inside elevation of the casing plate, the side web of the reel partly being removed, Fig. 4 is a side elevation of the reel. Fig. 5 is a longitudinal section of the crank arbor and the sleeve surrounding it to show the engagement of the inwardly projecting pin bearing 10 with the arbor.

Like numerals in all the several views designate like parts.

My invention I have shown as applied to an ordinary fishing reel comprising the central rotary spindle 2 and the attached concavo-convex webs 3, 3, rotating between two side plates 4. The spindle 3 is supported at its ends in the side plates 4 so as to be freely rotatable therein, the interior faces of the side plates being formed with an annular groove 4′ as shown in Figs. 2 and 3 to accommodate the outwardly flared edge of the web 3. The side plates are held in apposition by the cross bars 4′ as is usual in this class of devices, the two lower bars being somewhat larger than the other bars and placed close together to support the base plate 4″ which is designed to rest upon the rod.

The ends of the spindle 3 are reduced as at 3′ and enter bearing bushings 5 in the center of plates 4. Caps 6′ cover these bushings, permitting the bearings to be oiled. One side plate, preferably that on the right hand side, is cut out as at $4^X$ to accommodate the multiplying gears of the reel. These consist of a gear wheel 6 fast on shaft 3 and a pinion 7 engaging therewith. This pinion is mounted on an arbor extending through to the outside of said plate 4 and there attached to a crank.

In detail, the pinion 7 is mounted on an arbor 8, rotatably mounted in a sleeve 9 through which it is also capable of slight longitudinal movement. The arbor 8 is tubular and into the open inner end projects the pin 10 carried by the bridge plate 10′, which in turn is held to the side plate 4 by the screws 10″. This bridge plate and pin forms a bearing for the inner end of the shaft, the outer end having a bearing in the sleeve 9. The sleeve 9 is shouldered at 9′ and a spring 11 surrounds the shaft, bearing at one end against shoulder 9′ and at the other against the face of pinion 7, this acting to force the arbor and pinion inward and keep it in engagement with the gear 6. At its outer end the arbor 8 is connected rigidly to the crank arm 12, which extends in both directions from the arbor and carries at one end a handle 12′ and at the other the counterbalance 12″. The crank arm is longitudinally slotted as at $12^X$. On the inside face of the crank arm is mounted a slide 13 having a lug on its inside face which projects through the slot $12^X$ and carries a finger 13′ sufficiently large to prevent its passage through the slot $12^X$.

The slide 13 has an extended surface in order to give a good bearing against the crank. The inner end of the slide 13 is pronged or cut out in the center so as to leave two projecting arms and this cut-out inner end is adapted, when the slide is forced inward, to engage between the outer end of the sleeve 9 and the inner face of the crank arm 12. The arbor 8 is provided with the usual square head at its outer end over which a recess in the crank arm fits,—the crank arm being held to the arbor by the screw 14.

It will be noticed that the pinion 7 is considerably narrower than the gear 6 and will only engage with said gear when the arbor and pinion are in the position shown in Fig. 2. When, however, the crank arm is drawn laterally outward against the force of spring 11, the pinion disengages from gear 6, thus leaving the spindle 2 and its spool to rotate entirely free of engagement with the crank arm. The slide 13 is for the purpose of holding the arbor 8 drawn out to its full extent in order to disengage the gears. The slide is freely shiftable and thus immediately the crank arm is drawn outward may be easily slipped downward between the outer end of the sleeve 9 and the inner face of the crank arm, as before stated. It will be seen that the disengaging device is thus constantly under the control of the operator and adjacent to the fingers he is using for operating the reel; that the operator is not obliged to take his hand from the crank in order to engage or disengage the barrel from the crank but that the slide may be operated by the fingers while the crank handle is being grasped by the thumb and first finger. This is of considerable importance for the reason that in fishing for game fish every second is of value, and in the excitement of the moment it is not always easy to feel for and find a thumb piece or slide located on some other portion of the reel than that adjacent to the crank itself.

My improvement may be easily added to ordinary reels now on the market and adds very greatly to their value.

While I have shown what I regard as the best and simplest embodiment of my invention, I do not wish to be limited thereto as various changes may be made in the details of the parts without departing therefrom, nor do I wish to be limited to a multiplying reel though I regard this as being particularly applicable to multiplying reels.

Having described my invention what I claim is:

1. In a fishing reel, a spool, a spindle for carrying the same, a supporting frame in which said spindle is mounted to rotate, a crank arm on the exterior of said supporting frame, a laterally shiftable crank arbor on which the crank arm is mounted, mechanism for engaging the crank arbor with said spindle when the arbor is shifted inward, a sleeve in which the arbor is supported and against the end of which the crank arm normally bears, and a slide shiftably mounted on the crank arm and adapted to be interposed between the end of the sleeve and the crank arm to hold the arbor and crank arm in their outwardly shifted position.

2. In a fishing reel, a spool, a spindle for carrying the same, a supporting frame in which said spindle is mounted to rotate, a crank arm on the exterior of said supporting frame having a longitudinal slot therein, a laterally shiftable crank arbor on which the crank arm is mounted, a spring for normally forcing said crank arbor inward, mechanism for engaging the crank arbor with said spindle when the arbor is shifted inward, a sleeve in which the arbor is supported and against the end of which the crank arm normally bears, a slide shiftably mounted in a longitudinal slot in the crank arm and adapted to be pushed inward between the end of the sleeve and the crank arm to hold the arbor and crank arm in their outwardly shifted position, and disengaged from the reel spindle.

3. In a fishing reel, a spool, a spindle for carrying the same, a supporting frame in which said spindle is mounted to rotate, a gear wheel on said spindle, a crank arm on the exterior of said supporting frame, a laterally shiftable crank arbor on which the crank arm is mounted, a pinion on the inner end of said crank arbor adapted to engage with the spindle gear when the arbor is shifted to its innermost position, a sleeve in which the arbor is supported and against the outer end of which the crank arm normally bears, and a slide shiftably mounted on the crank arm and adapted to be interposed between the end of the sleeve and the crank arm when the arbor and crank are shifted outward.

4. In a fishing reel, a spool, a spindle for carrying the same, a supporting frame in which said spindle is mounted to rotate, a gear wheel on said spindle, a longitudinally slotted crank arm on the exterior of said supporting frame, a laterally shiftable crank arbor on which the crank arm is mounted, a pinion on said crank arbor adapted to engage with the spindle gear when the arbor is shifted to its innermost position, a sleeve in which the arbor is supported and against the outer end of which the crank arm normally bears, a spring within the sleeve and surrounding the crank arbor forcing the said arbor inward, and a slide shiftably mounted in a longitudinal slot in the crank arm and adapted to be interposed between the end of the sleeve and the crank arm when the arbor and crank are shifted outward.

5. In a fishing reel, a spool, a spindle for carrying the same, a supporting frame in which said spindle is mounted to rotate, a gear wheel on said spindle, a longitudinally slotted crank arm on the exterior of said supporting frame, a laterally shiftable crank arbor on which the crank arm is mounted, a pinion on said crank arbor adapted to engage with the spindle gear when the arbor is shifted to its innermost position, a sleeve in which the arbor is supported and against the outer end of which the crank arm normally bears, a spring within the sleeve and surrounding the crank arbor forcing the said arbor inward, and a slide on the inner face of said crank arm having a finger piece projecting through the slot thereof, said slide at its inner end being cut out to partly surround the crank arbor, said slide being adapted when moved inward the length of said slot to be interposed between the crank arm and the end of the sleeve to hold the crank arbor and its pinion out of engagement with the spindle gear wheel.

6. In a fishing reel, a spool, a spindle for carrying the same, a supporting frame in which said spindle is mounted to rotate recessed on the inside face thereof, a gear wheel on said spindle located within said recess, a longitudinally slotted crank arm on the exterior of said supporting frame, a laterally shiftable tubular crank arbor on which the crank arm is mounted, a pinion on said crank arbor located in said recess of the frame and adapted to engage with the spindle gear when the arbor is shifted to its innermost position, a plate bridging the recess in the side support and having a pin projecting into the inner end of the tubular arbor to form a bearing for the same, and a slide on the inner face of said crank arm having a finger piece projecting through the slot thereof, said slide at its inner end being cut out to partly surround the crank arbor, said slide being adapted when moved inward the length of said slot to be interposed between the crank arm and the end of the sleeve to hold the crank arbor and its pinion out of engagement with the spindle gear wheel.

In testimony whereof, I have signed my name to this specification in the presence of two subscribing witnesses, this 27th day of March 1907.

CHARLES ULRICH.

Witnesses:
FREDERIC B. WRIGHT,
JAS. F. NAGLE.